United States Patent
Ikeuchi et al.

(10) Patent No.: US 8,429,357 B2
(45) Date of Patent: Apr. 23, 2013

(54) DEVICE MANAGEMENT APPARATUS, DEVICE INITIALIZATION METHOD, AND DEVICE SYSTEM

(75) Inventors: Kazuhiko Ikeuchi, Kawasaki (JP); Mikio Ito, Kawasaki (JP); Hidejirou Daikokuya, Kawasaki (JP); Chikashi Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 331 days.

(21) Appl. No.: 12/716,788

(22) Filed: Mar. 3, 2010

(65) Prior Publication Data

US 2010/0228917 A1 Sep. 9, 2010

(30) Foreign Application Priority Data

Mar. 6, 2009 (JP) .................................. 2009-54188

(51) Int. Cl.
*G06F 12/00* (2006.01)
*G06F 13/00* (2006.01)

(52) U.S. Cl.
USPC ................ 711/154; 711/100; 711/170; 713/1

(58) Field of Classification Search .................. 711/100, 711/154, 170; 713/1
See application file for complete search history.

(56) References Cited

U.S. PATENT DOCUMENTS

| 6,681,291 B2 | 1/2004 | Ikeuchi et al. |
| 6,851,022 B2 | 2/2005 | Ikeuchi et al. |
| 2003/0120674 A1 | 6/2003 | Morita et al. |

FOREIGN PATENT DOCUMENTS

| JP | 2003-29933 | 1/2003 |
| JP | 2003-29934 | 1/2003 |
| JP | 2003-108316 | 4/2003 |
| JP | 2003-241904 | 8/2003 |

*Primary Examiner* — Midys Rojas
(74) *Attorney, Agent, or Firm* — Staas & Halsey LLP (57) ABSTRACT

A device management apparatus that executes an initialization processing to a device that stores user data includes a first initialization processing section for executing a first initialization processing in which a progress status of an initialization is notified to another device management apparatus every time when the initialization equivalent to a processing unit of the initialization processing is executed to the device, a second initialization processing section for executing a second initialization processing in which a progress status of an initialization is notified to the another device management apparatus every time when the initialization for the predetermined number of processing units is executed to the device, a monitoring unit for monitoring a status of access to the device and an operation state of the device, and a changeover section for changing over the first initialization processing and the second initialization processing based on a monitoring result.

12 Claims, 6 Drawing Sheets

DEVICE MANAGEMENT APPARATUS, DEVICE INITIALIZATION METHOD, AND DEVICE SYSTEM

CROSS-REFERENCE TO RELATED APPLICATION

This application is based upon and claims the benefit of priority of the prior Japanese Patent Application No. 2009-54188, filed on Mar. 6, 2009, the entire contents of which are incorporated herein by reference.

FIELD

Embodiment(s) discussed herein relate to a device managing apparatus, a device initialization method, and a device system that execute an initialization processing to a device that stores user data.

BACKGROUND

When a recording medium, such as a magnetic disc, an optical magnetic disk, an optical disc, or the like, is used as a device for storing user data, it is required to preliminarily execute initialization of the recording medium, that is, format before actually writing user data.

Conventionally, it has been impossible to use the device before format of the entire device is completed. Accordingly, there has been a problem in that the length of the time required for completing format is too long. Consequently, a quick format for executing an initialization processing in a background of access to the device has been used.

In the quick format, in order to allow access right after initialization, a progress status of the initialization is managed by using a bitmap or the like. Then, when access to a format uncompleted area is required, the access is processed after the area is preferentially formatted.

Herein, in a device system that has a plurality of device control apparatuses managing access to a device and in which access to the device is duplicated, it is also required to duplicate the management of the progress status of the initialization. Consequently, in a conventional quick format, an update processing of a bitmap is executed and duplication of the bitmap is executed between the device control apparatuses at a timing when initialization of an area equivalent to one bit in a bitmap is completed.

However, when considering the time required for duplication of the format progress status, the time until the format is completed becomes shorter when the number of duplication of the format progress status to be executed is low.

That is, when frequency of the duplication of the progress status is considerably higher than generation frequency of access to the device during format, the time required for the format becomes long by the duplication processing. On the other hand, when frequency of the duplication of the progress status is considerably lower than generation frequency of access to the device during format, a number of accesses are forced to wait, causing lowering of access responsiveness and occurrence of time out. Further, since generation frequency of access is not constant, it has been difficult to obtain the optimum one value as for the timing for executing duplication of the format progress status.

The disclosed technique is made in the light of the aforementioned problems, and the object is to provide to a device control apparatus, a device initialization method, and a device system which make it possible to shorten the time required for format while ensuring access performance to a device.

SUMMARY

A device management apparatus that executes an initialization processing to a device that stores user data includes a first initialization processing section for executing a first initialization processing in which a progress status of an initialization is notified to another device management apparatus every time when the initialization equivalent to a processing unit of the initialization processing is executed to the device, a second initialization processing section for executing a second initialization processing in which a progress status of an initialization is notified to the another device management apparatus every time when the initialization for the predetermined number of processing units is executed to the device, a monitoring unit for monitoring a status of access to the device and an operation state of the device, and a changeover section for changing over the first initialization processing and the second initialization processing based on a monitoring result.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

DESCRIPTION OF EMBODIMENTS

Hereinafter, an embodiment of a device management apparatus, a device initialization method, and a device system disclosed by the invention will be described in detail based on the drawings. The invention is not limited by the embodiment.

Figure 1:
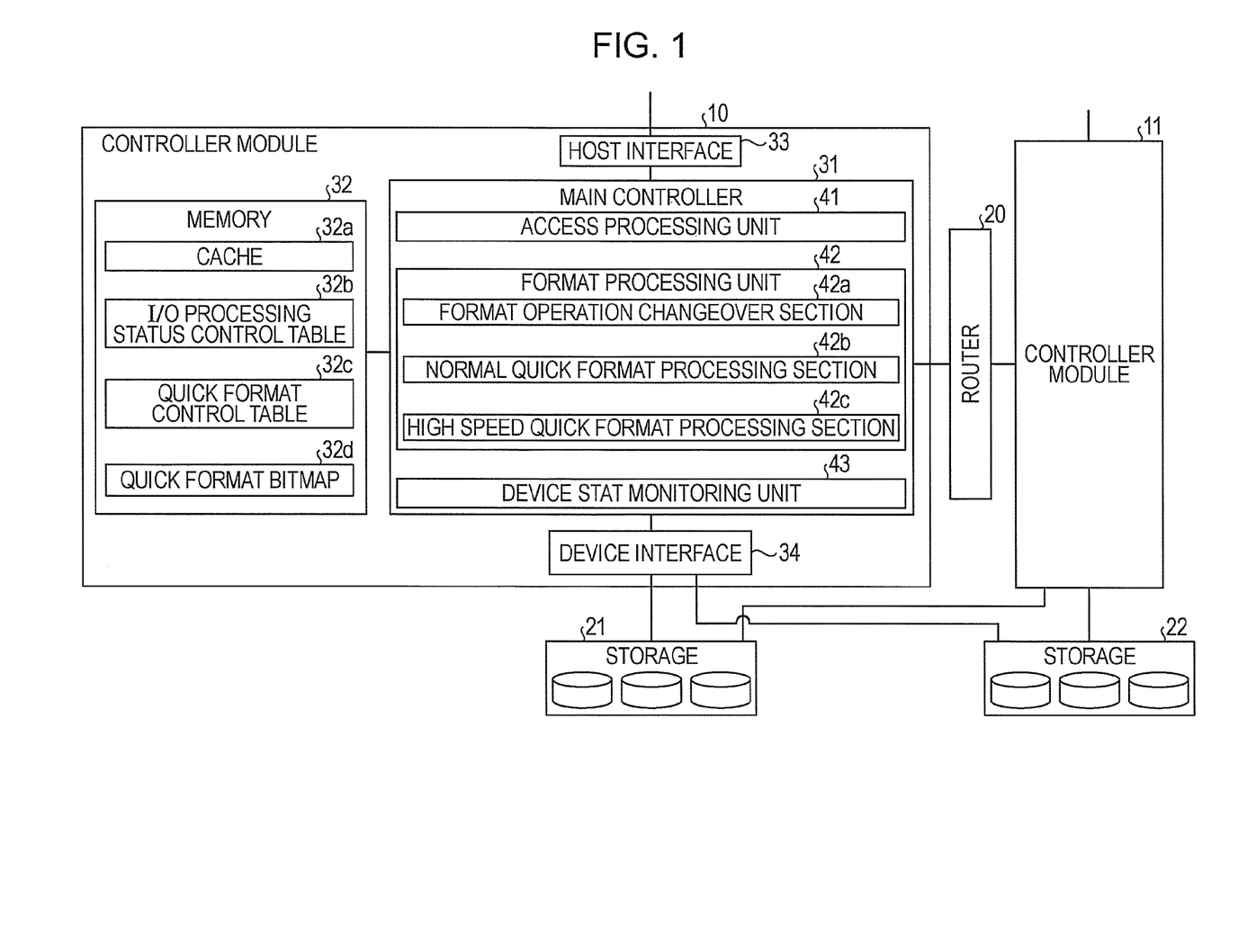
FIG. 1 is a diagram schematically showing the structure of a storage system which is an embodiment of a device system.

FIG. 1 is a diagram schematically showing the structure of a storage system which is an embodiment of the device system.

The storage system shown in FIG. 1 includes controller modules 10, 11 which are examples of device management apparatuses. The controller module 10 is connected with storages 21, 22, each of which includes a plurality of data devices for storing user data. Similarly, the controller module 11 is also connected with the storages 21, 22, and the controller module 10 and the controller module 11 are connected via a router 20.

The controller module 10 and the controller module 11 are respectively connected with a host (not shown). Herewith, access to the storages 21, 22 is duplicated.

The controller module 10 has a main controller 31, a memory 32, a host interface 33, and a device interface 34. The main controller 31 includes an access processing unit 41, a format processing unit 42, a device state monitoring unit 43. Each processing unit of the main controller 31 may be respectively provided by a wired logic, a PLD (Programmable Logic Device), or the like. The main controller 31 may be provided by an operation device such as a CPU (Central Processing Unit) or the like and each processing may be provided by software.

The access processing unit 41 receives an access requirement to the storage from the host via the host interface 33, and processes the access to the storages 21, 22 via the device interface 34.

The format processing unit 42 is a processing unit that executes an initialization processing of the device equipped in the storages 21, 22. The format processing unit 42 includes a format operation changeover section 42a, a normal quick format processing section 42b, and a high speed quick format processing section 42c.

The normal quick format processing section 42b and the high speed quick format processing section 42c respectively execute a quick format to the storages 21, 22. Herein, the quick format is a format system for executing an initialization processing in a background of access to the device. The normal quick format processing section 42b executes a normal quick format in which a progress status of the initialization is notified to the controller module 11 which is another device management apparatus every time when an initialization equivalent to a processing unit of the initialization processing is executed to duplicate the progress status of the initialization. On the other hand, the high quick format processing section 42c executes a high speed quick format in which a progress status of the initialization is notified to the controller module 11 which is another device management apparatus every time when an initialization for predetermined number of processing units of not less than two is executed to duplicate the progress status of the initialization. The format operation changeover section 42a changes over the normal quick format and the high speed quick format based on the monitoring result by the device state monitoring unit 43.

The device state monitoring unit 43 monitors the generation status of access to the storages 21, 22 and the operation state of the storages 21, 22.

The memory 32 is a storage for holding various data used in the controller module 10. The memory 32 includes a cache 32a, an IO processing status management table 32b, a quick format management table 32c, and a quick format bitmap 32d.

The cache 32a is used when the access processing unit 41 processes access to the storages 21, 22. Specifically, the access processing unit 41 holds an address of a writing destination and a content to be written in the storage when a writing request to the storage is received from the host, and returns a writing response to the host. Then, by executing a write back for actually writing the content held in the cache 32a to the storages 21, 22, the writing request from the host is reflected in the storages 21, 22.

The IO processing status management table 32b holds a monitored result of the device state monitoring unit 43. Specifically, The IO processing status management table 32b holds the type, response time, throughput, generation frequency of access, and the like of each device of the storages 21, 22.

The quick format management table 32c holds the information showing that which device is a target of format when the quick format is being executed by the format processing unit 42, a processing unit of the initialization processing, that is, that one bit on the quick format bit map 32d corresponds to how much amount in the device, that each bit of the quick format bitmap 32d corresponds to which address in the device, and the like. Note that, that one bit on the bitmap 32d corresponds to how much capacity on the device can be appropriately set. For example, one megabit in the device corresponds to one bit on the bitmap 32d.

The quick format bitmap 32d holds the progress status of the quick format. One bit on the bitmap is a processing unit of the initialization processing, and that one bit corresponds to how much capacity in the device, and the correspondence relationship between each bit and the real address in the device are regulated in the quick format management table 32c.

The example is illustrated in which the cache 32a, the IO status management table 32b, the quick format management table 32c, and the quick format bitmap 32d are held in the same memory 32. However, a different storage may be provided for every information, or the cache 32a, the IO status management table 32b, the quick format management table 32c, and the quick format bitmap 32d may be decentrally stored in a plurality of storages by any combination.

The controller module 11 has the inner structure similar to the controller module 10. Herein, the example in which there are two controller modules is illustrated. However, there may be not less than three controller modules.

Figure 2:
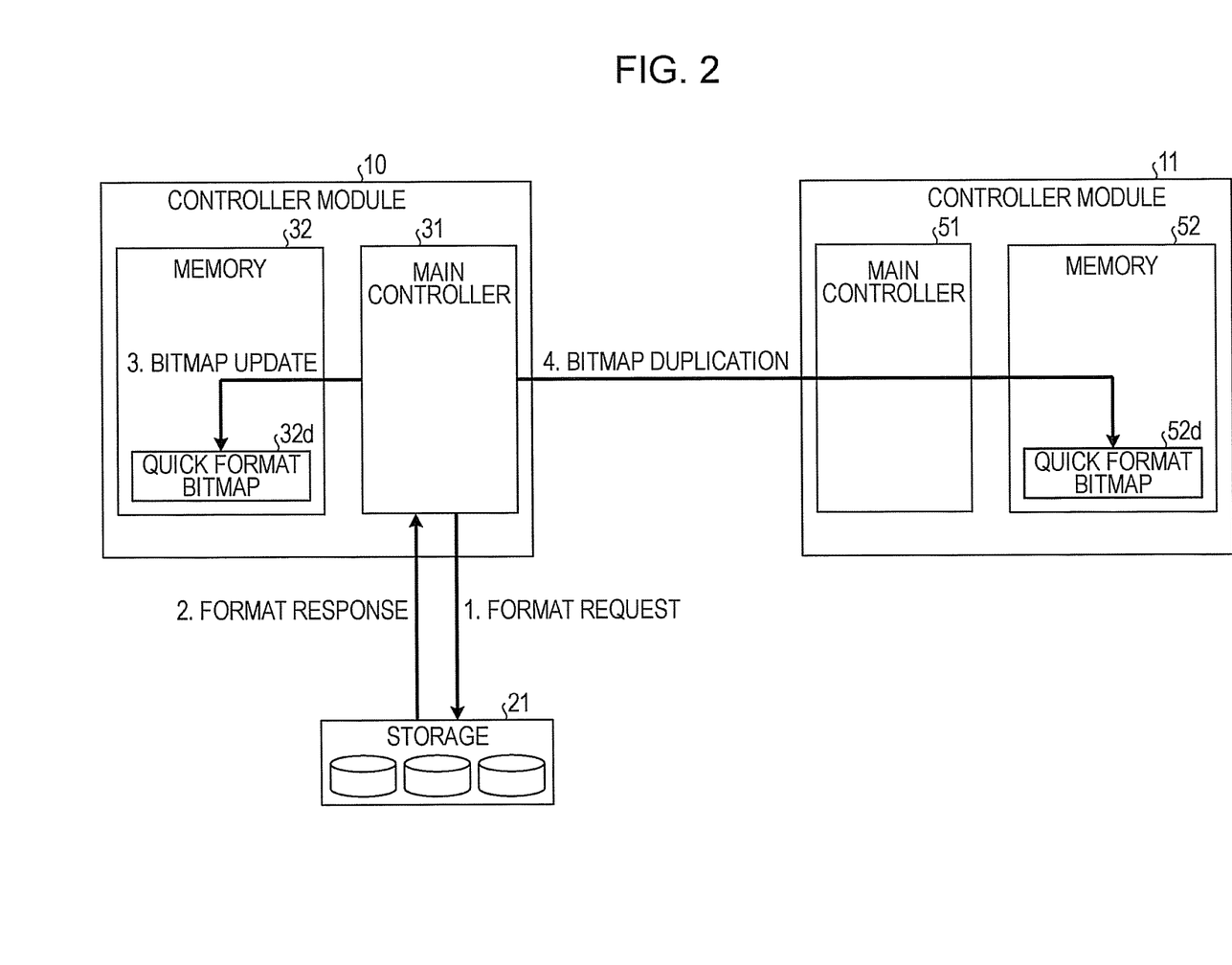
FIG. 2 is a diagram showing a concrete processing operation of a format processing by a format processing unit.

FIG. 2 is a diagram illustrating a concrete processing operation of the format processing by the format processing unit 42. First, the format processing unit 42 transmits a format request to the storage 21. The format request is a writing request of initial data. As the initial data, any data pattern can be used.

The storage 21 executes a format request, specifically, a writing instruction of initial data in an area in the device corresponding to 1 bit in the bit map, and returns a format response with respect to the format request to the format processing unit 42 after the writing processing in the area in the device corresponding to 1 bit in the bit map is finished.

The format processing unit 42 updates the quick format bitmap 32d in response to the format response. Then, the format processing unit 42 transmits a bitmap update content to the controller module 11. A main controller 51 of the control module 11 reflects the received update content in a quick format bitmap 52d in a self memory 52 to duplicate the bitmap.

In the normal quick format, the normal quick format processing section 42b executes a format request, bitmap update, and bitmap duplication for every one bit of the quick format bitmap 32d.

In the high speed quick format, the high quick format processing section 42c reduces the frequency of bitmap duplication as compared with the normal quick format. That is, the high speed quick format processing section 42c executes bitmap duplication after the format equivalent to plurality of bits is executed. Accordingly, in the high quick format, the progress status of the format is grasped only at the controller module 10 side.

Note that the format request in the high speed format may be executed for every one bit, or for several bits integrally. Further, the quick format bitmap 32d may be used for the management of the local progress status at the controller module 10 side. Further, the management of the local progress status may be held in the quick format management table 32c.

When a wiring request to the device executing the format from the host is generated, the access processing unit 41 holds the content of writing request, that is, an address of a writing destination and a writing content in the cache 32a, and returns a writing response to the host. Next, the access processing unit 41 specifies the bit indicating the corresponding area with reference to the quick format management table 32c based on the writing destination address. Then, the access processing unit 41 judges whether or not format of the writing destination is completed based on the state of the bit corresponding to the writing destination.

As a result, when format of the writing destination is completed, the data in the cache is written in the device without change. When the format of the writing destination is not completed, first, format is executed to the unit area that is managed by the bitmap including the writing destination, and the data in the cache is written in the device.

In this manner, even when format is being executed, the writing request from the host can be processed. However, when judging whether or not format of the address of the writing request destination is completed, it is required that the progress status of the format is duplicated.

Accordingly, when the content in the cache is written in the device, it is necessary to wait for completion of the duplication of the progress status of the format. In the normal quick format, since duplication of the bitmap is executed at a high frequency, the waiting time until write back is executed is short. However, when the generation frequency of write back is low, the time for duplicating the bitmap itself becomes an extra time. In the high speed quick format, since the frequency of duplication of the bitmap is low, the time for the entire format can be shortened. However the wait time until write back is executed becomes long. Further, a number of accesses are forced to wait, causing lowering of access responsiveness and occurrence of time out.

Consequently, the format operation changeover section 42a changes over the normal quick format and the high speed quick format based on the generation status of the access to the storages 21, 22 and the operation state of the storages 21, 22.

Specifically, the format operation changeover section 42a changes over to the high speed quick format when there is no access from the host for a constant period, for example, several seconds to several minutes, during executing the normal quick format.

Then, during when the high speed quick format is executed, the format operation changeover section 42a accumulates the writing request from the host in the cache 32a during a constant period, for example, several seconds to several minutes, and stands by to write back to the device. Further, the format operation change over section 42a can change over to the normal quick format when the write cache reaches a constant ratio of the entire cache 32a.

Further, the format operation changeover section 42a can judge that effect to the host access by the high speed quick format is small when the access amount to the device from the host is not more than a constant value during the normal quick format to change over to the high speed quick format.

Further, the format operation changeover section 42a can continue the high speed quick format when a response time or a throughput of the storage shows a performance of not less than a constant value even when the high speed quick format is being executed, and can change over to the normal quick format when there is a performance deterioration. Specifically, when the interface between the controller module and the storage becomes a bottleneck than the interface between the controller modules, it is no problem to execute a duplication processing by the communication between controller modules, and since reliability can be assured by the duplication processing, it is efficient to continue the high speed quick format until there appears a performance deterioration in the processing with respect to the storage.

In this manner, the format operation changeover section 42a optimizes the resource in the apparatus without reducing access performance from an external part and without detracting reliability.

Figure 3:
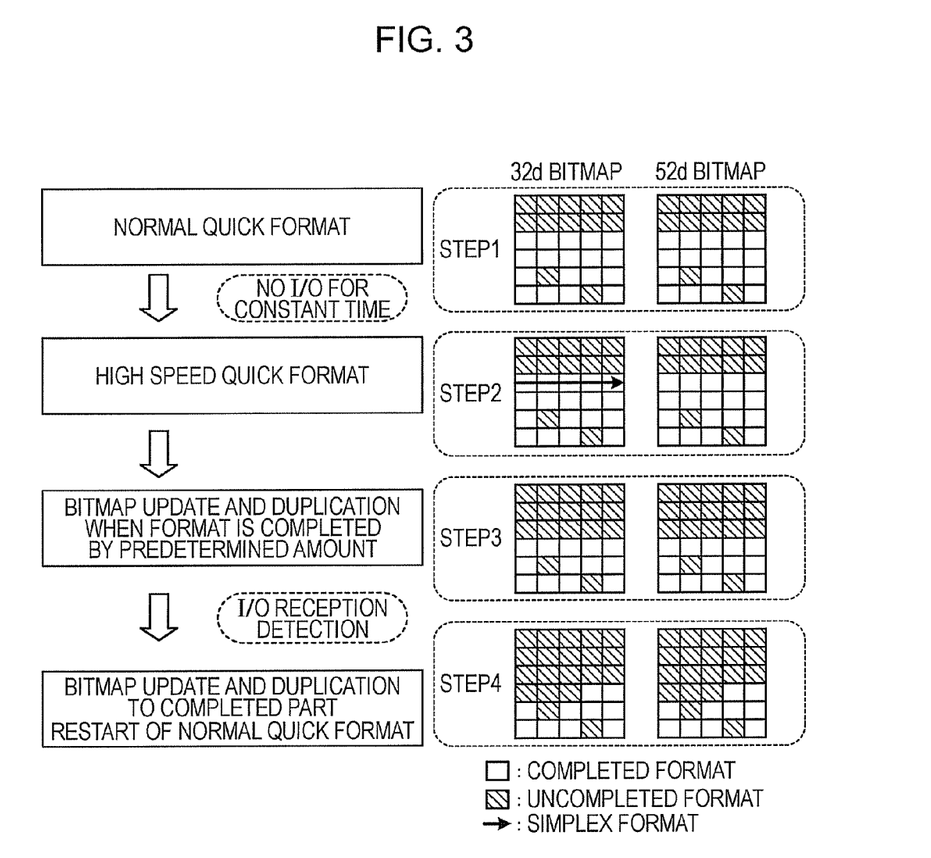
FIG. 3 is a diagram showing a concrete example of changeover of a quick format.

FIG. 3 is a diagram showing a concrete example of the changeover of the quick format. In the example shown in FIG. 3, the format processing unit 42 starts format by the normal quick format first. In the normal quick format, since update of the bitmap is constantly duplicated, the content of the quick format bitmap 32d of the controller module 10 and the content the quick format bitmap 52d of the controller module 10 become always the same.

Then, the format processing unit 42 changes over from the normal quick format to the high speed quick format when there is no input or output from the host for a constant period. In the high speed quick format, it becomes a simplex format in which only the controller module 10 locally manages the progress status of the format. When the local management of the progress status is executed by using the quick format bitmap 32d, a time lag is generated until the contents of the quick format bit map 32d and the quick format bitmap 52d are matched. Further, when the local progress status management is executed except the quick format bitmap 32d, the contents of the quick format bitmap 32d and the quick format bitmap 52d are matched. However, a time lag is generated with respect to an actual progress status of the format.

The format processing unit 42 executes update and duplication of the bitmap every time the format is progressed by a predetermined amount. Further, when an access from the host is detected during the high speed quick format, the format processing unit 42 executes update and duplication of the bitmap for a part for which format is completed, and then, changes over to the normal format.

Figure 4:
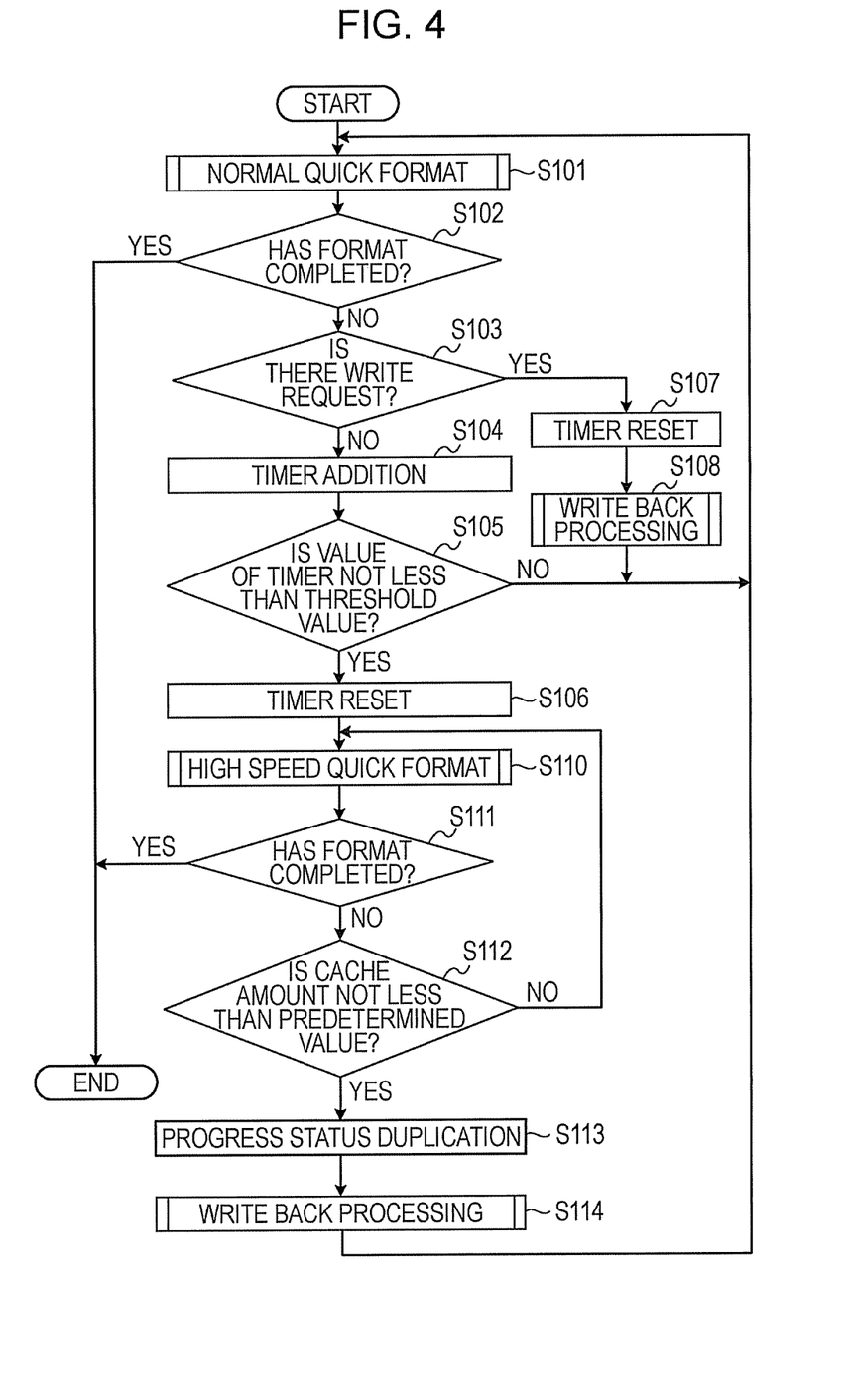
FIG. 4 is a flow chart illustrating a processing operation of the format processing unit.

Next, a processing operation of the format processing unit will be further described with reference to FIG. 4. FIG. 4 is a flow chart illustrating the processing operation of the format processing unit 42. When the quick format is started, the format processing unit 42 first makes the normal quick format processing section 42b execute the quick format (S101). Then, the format processing unit 42 judges whether or not the format of the entire device is completed (S102), and when the format is completed (S102, Yes), the processing is finished.

On the other hand, when an area of an uncompleted format is remained in the device (S102, No), the format operation changeover section 42a refers to the cache 32a and judges whether or not there is a write cache in the cache 32, that is, whether or not a writing request is generated (S103). When there is a write cache in the cache 32a (S103, Yes), the format operation changeover section 42a resets a timer (S107), makes the access processing unit 41 execute a write back processing (S108), and executes the normal quick format again (S101).

On the other hand, when there is no write cache in the cache 32 (S103, No), the format operation changeover section 42a adds a certain value to a timer value (S104), and executes the normal quick format (S101) when the value of the timer is less than a predetermined value (S105 No).

Then, when the value of the timer becomes not less than a predetermined value (S105, Yes), the format operation changeover section 42a resets the timer (S106), and changes over to the high speed quick format executed by the high quick format processing section 42c (S110). Then, the format processing unit 42 judges whether or not the format of the entire device is completed (S111), and when the format is completed (S111, Yes), the processing is finished.

On the other hand, when an area of uncompleted format remains in the device (S111, No), the format operation changeover section 42a refers to the cache 32a, and compares the write cache amount in the cache 32a with a predetermined threshold value (S112). As a result, when the cache amount is less than the predetermined threshold value (S112, No), the high speed quick format processing section 42c executes the high quick format again (S110). On the other hand, when the cache amount is not less than the predetermined threshold value (S112, Yes), the format processing unit 42 duplicates the progress status of the format (S113), and executes a write back processing of the data in the cache (S114), and returns to the normal quick format (S101).

Figure 5:
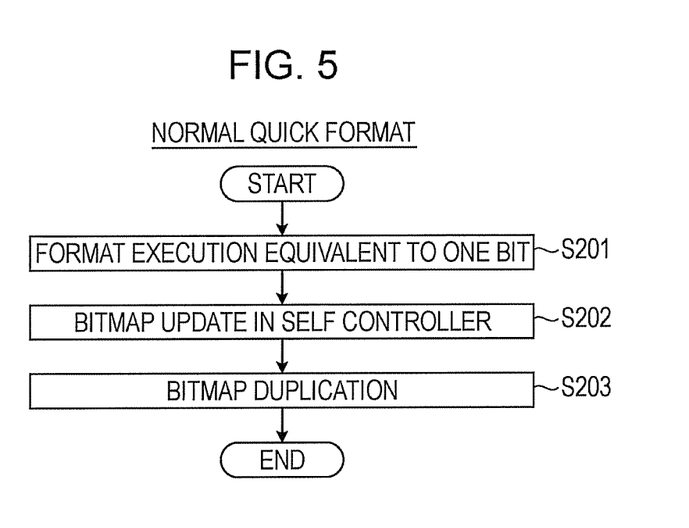
FIG. 5 is a flow chart illustrating a processing operation of a normal quick format by a normal quick format processing section.

FIG. 5 is a flow chart illustrating the processing operation of the normal quick format executed by the normal quick format processing section 42b. First, the normal quick format processing section 42b executes a format equivalent to one bit on the quick format bitmap 32d with respect to the device (S201), and updates the quick format bitmap 32d in the self controller (S202). Then, the normal quick format processing section 42b duplicates the bitmap (S203), and finishes the normal quick format processing.

Figure 6:
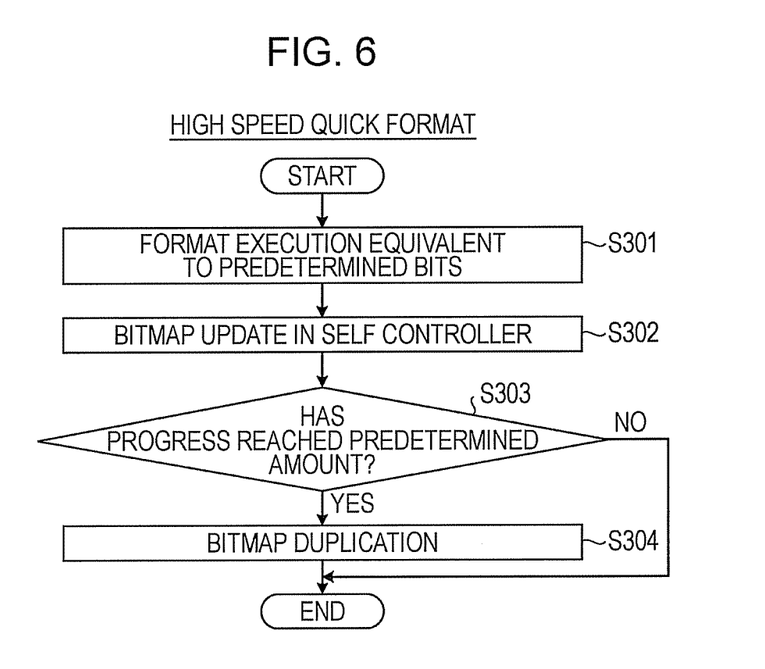
FIG. 6 is a flow chart illustrating a processing operation of a high speed quick format by a high speed quick format processing section.

FIG. 6 is a flow chart illustrating the processing operation of the high speed quick format executed by the high speed quick format processing section 42c. First, the high speed quick format processing section 42c executes a format equivalent to predetermined number of bits on the quick format bitmap 32d to the device (S301), and updates the quick format bitmap 32d in the self controller (S302). By the update of the bitmap, when the progress of the format that is not duplicated reaches a predetermined amount (S303, Yes), the high speed quick format processing section 42c duplicates the bitmap (S304), and finishes the high speed quick format processing. Further, when the progress of the format that is not duplicated does not reach the predetermined amount (S303, No), the high speed quick format processing section 42c finishes the high speed quick format processing without change.

Figure 7:
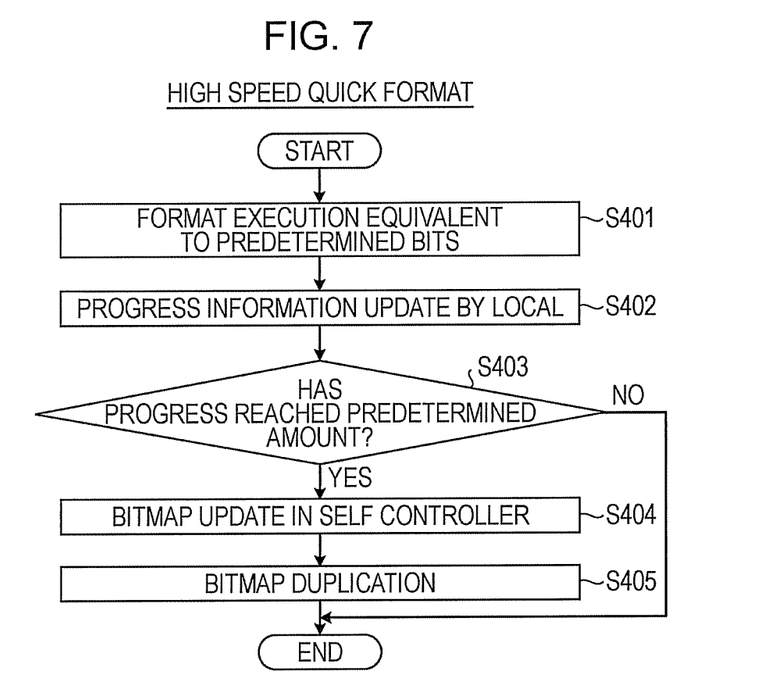
FIG. 7 is a flow chart showing a processing operation when a local progress status management is executed except a bitmap.

The processing operation shown in FIG. 6 is an operational example when a bitmap is used for locally managing the progress status. However, the local management of the progress status can be executed without using a bitmap. FIG. 7 is a flowchart showing a progressing operation when the local management of the progress status is executed without using a bitmap.

In the example shown in FIG. 7, the high speed quick format processing section 42c executes a format equivalent to predetermined number of bits (S401), and locally updates the progress information (S402). The local progress information may be created in, for example, the quick format management table 32c or the like.

Next, the high speed quick format processing section 42c judges whether or not the local progress reaches a predetermined amount (S403). When the local progress reaches the predetermined amount (S403, Yes), the high speed quick format processing section 42c updates the quick format bitmap 32d in the self controller (S404), duplicates the bitmap (S404), and finishes the high speed quick format processing. Further, when the progress of the format that is not duplicated reaches the predetermined amount (S403, No), the high speed quick format processing section 42c finishes the high speed quick format processing without change.

Figure 8:
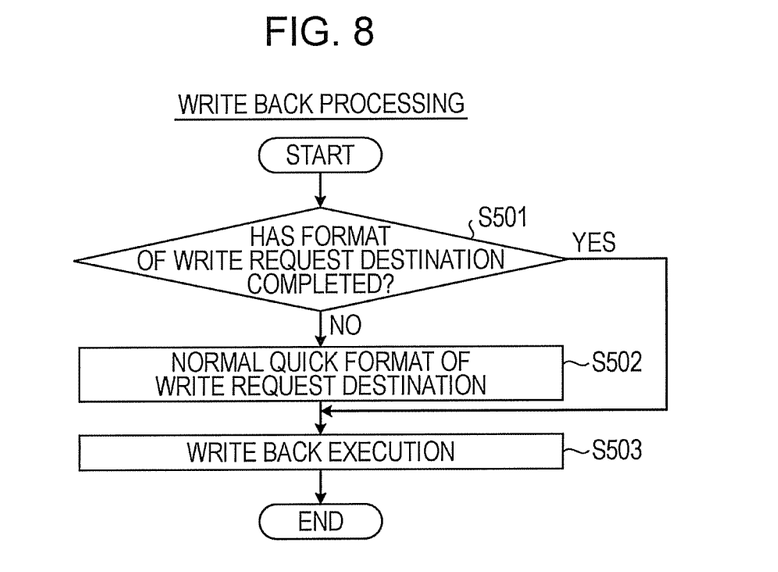
FIG. 8 is a flow chart illustrating a write back processing shown in FIG. 4 in detail.

FIG. 8 is a flow chart illustrating the write back processing shown in FIG. 4 in detail. First, the format processing unit 42 judges whether or not the format of the writing request destination of the write cache is completed (S501). As a result, when the format of the writing request destination is not completed, format of the bit including the writing request destination is executed by the normal quick format (S502).

After step S502, or when format of the writing request destination is completed (S501, Yes), the access processing unit 41 executes a write back for reflecting the write cache to the device (S503), and the write back processing is finished.

As described above, in the embodiment, in the case where there is no access to the device during the quick format for a predetermined period, the progress management of the quick format is executed by a simplex at the controller module 10 side, and when the quick format is completed by a constant amount, the progress status is notified to the controller module 11 for duplication. In this manner, a necessary time of format can be shortened by changing the execution frequency of the duplication processing of the progress status based on the generation status of access and the state of the device.

Further, since format type is returned to the normal quick format depending on the frequency of access, the access performance to the device during executing the quick format can be assured.

Further, when the local management of the progress status is executed independent from the bitmap, further speeding up of the processing can be provided.

Similarly, during the high speed quick format, when format requests to the device are collectively executed, a format range per one time becomes large, so that the number of command processing between the controller module and the storage is reduced, the sequential property of the device inner operation is improved, and further speeding up the format processing can be provided.

Note that in the embodiment, description is made for the embodiment in the case where a bitmap is used for the management of the progress status. However, the disclosed technique is not limited to this, and any progress management can be applied. For example, the progress status of format is managed by holding the final address of the format that is sequentially executed and the address that is preferentially formatted by host access.

Similarly, the changeover of the normal quick format and the high speed quick format can be adequately combined for use according to the generation frequency and generation interval of access from the host, the operation state of the device, and the like.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT).

Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

The invention claimed is:

1. A device management apparatus that executes an initialization processing to a device that stores user data in a background of access to the device, comprising:
   a memory, which stores a plurality of instructions; and
   a processor executing the instructions, the processor,
      executing a first type of initialization processing in which a progress status of an initialization is notified to another device management apparatus when a processing of the initialization having a first value is executed to the device, the processing being equivalent to a processing unit of the initialization processing,
      executing a second type of initialization processing in which a progress status of an initialization is notified to the other device management apparatus when a processing of the initialization having a value greater than the first value is executed, the processing being for a predetermined number of processing units,
      monitoring at least one of a generation status of access to the device and an operation state of the device, and
      changing over between the first type of initialization processing and the second type of initialization processing based on a monitoring result of the monitoring.

2. The device management apparatus according to claim 1, wherein
   in the executing of the second type of second type of initialization processing, the processor individually manages the notified progress status and a progress status updated after the notification.

3. The device management apparatus according to claim 1, wherein
   in the executing of the second type of second type of initialization processing, the processor updates the progress status of the initialization when the processing of the initialization is executed which is equivalent to the processing unit of the initialization processing, and notifies the other device management apparatus of the progress status of the initialization when the initialization for the predetermined number of processing units of not less than two is executed.

4. The device management apparatus according to claim 1, comprising:
   a bitmap whose processing unit of the initialization processing is one bit, and
   wherein the first initialization processing section and the second initialization processing section manage the progress status of the initialization processing by using the bitmap.

5. The device management apparatus according to claim 1, wherein
   the changing over changes over between the first type of initialization processing and the second type of initialization processing based on an access request interval to the device.

6. The device management apparatus according to claim 1, wherein
   the changing over changes over between the first type of initialization processing and the second type of initialization processing based on a storage amount of a write cache to the device.

7. The device management apparatus according to claim 1, wherein
   the changing over changes over between the first type of initialization processing and the second type of initialization processing based on a processing state of the device.

8. The device management apparatus according to claim 1, wherein the first value is 1 bit and the value of the second type of initialization processing is at least two bits.

9. A device initialization method executed by a device management apparatus that executes an initialization processing to a device that stores user data in a background of access to the device, comprising:
   a first initialization processing executing a first type of initialization processing in which a progress status of an initialization is notified to another device management apparatus when a processing of the initialization having a first value is executed to the device to duplicate the progress state of the initialization, the processing being equivalent to a processing unit of the initialization processing;
   a second initialization processing executing a second type of initialization processing in which a progress status of an initialization is notified to the other device management apparatus when a processing of the initialization having a value greater than the first value is executed to the device to duplicate the progress state of the initialization, the processing being for a predetermined number of processing units of not less than two;
   monitoring at least one of a generation status of access to the device and an operation state of the device; and
   changing over between the first type of initialization processing and the second type of initialization processing based on a monitoring result of the monitoring.

10. The device initialization method according to claim 9, wherein the first value is 1 bit and the value of the second type of initialization processing is at least two bits.

11. A device system equipped with a device that stores user data and a plurality of device management apparatuses executing an initialization processing to the device in a background of access to the device, the device management apparatus comprising:
   a memory, which stores a plurality of instructions; and
   a processor executing the instructions, the processor,
      executing a first type of initialization processing in which a progress status of an initialization is notified to another device management apparatus when a processing of the initialization having a first value is executed to the device, the processing being equivalent to a processing unit of the initialization processing;
      executing a second type of initialization processing in which a progress status of an initialization is notified to the other device management apparatus when a processing of the initialization having a value greater than the first value is executed to the device, the processing being for the predetermined number of processing units of not less than two;

duplicating a progress state of the initialization based on a notification from the first type of initialization processing or the second type of initialization processing of the other device management apparatus;

monitoring at least one of a generation status of access to the device and an operation state of the device; and changing over between the first type of initialization processing and the second type of initialization processing based on a monitoring result of the monitoring.

12. The device system according to claim 11, wherein the first value is 1 bit and the value of the second type of initialization processing is at least two bits.

* * * * *